M. HERZOG.
LIFTER FOR KITCHEN UTENSILS.
APPLICATION FILED APR. 23, 1912.
1,058,585.
Patented Apr. 8, 1913.
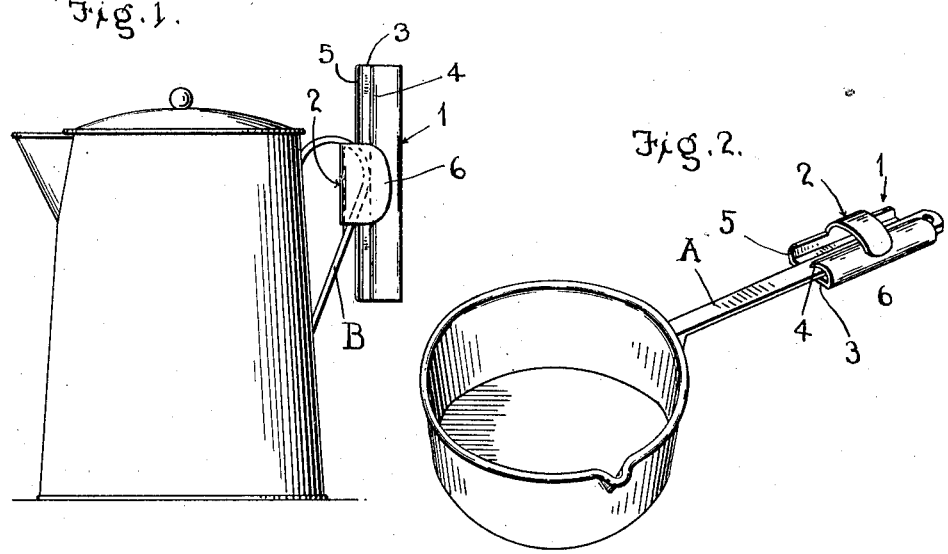
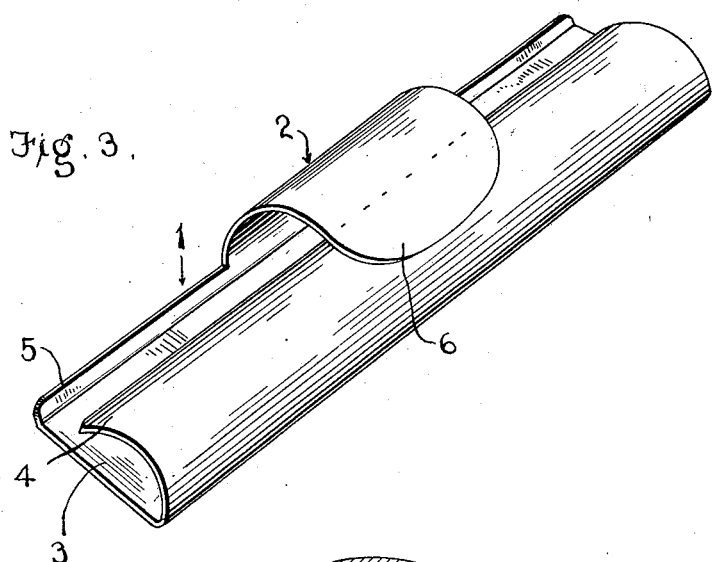
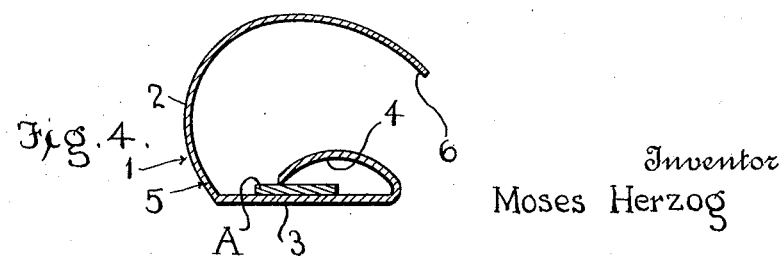
Witnesses
L. B. James
S. M. McColl
Inventor
Moses Herzog
by H. B. Williamson & Co.
Attorneys

UNITED STATES PATENT OFFICE.

MOSES HERZOG, OF WASHINGTON, DISTRICT OF COLUMBIA.

LIFTER FOR KITCHEN UTENSILS.

1,058,585.  Specification of Letters Patent.  Patented Apr. 8, 1913.

Application filed April 23, 1912. Serial No. 692,592.

*To all whom it may concern:*

Be it known that I, MOSES HERZOG, a citizen of the United States, residing at Washington, in the District of Columbia, have invented certain new and useful Improvements in Lifters for Kitchen Utensils; and I do declare the following to be a full, clear, and exact description of the invention, such as will enable others skilled in the art to which it appertains to make and use the same.

This invention relates to improvements in holders or lifters for kitchen utensils.

The object of the invention is to provide a simply constructed resilient metal device of this class which may be quickly and expeditiously applied to the handle of a spider, a kettle, coffee pot, pan or similar utensil without any portion of the hand being necessarily brought into engagement with the handle.

With this and other objects in view, the invention consists of certain novel features of construction, combination and arrangement of parts as will be more fully described and claimed.

In the accompanying drawings; Figure 1 represents a side elevation of a coffee pot equipped with this improved holder; Fig. 2 is a perspective view showing it applied to the handle of a sauce pan or spider; Fig. 3 is an enlarged perspective view of the holder detached; Fig. 4 is a transverse section thereof.

In the embodiment illustrated a one-piece resilient sheet metal holder 1 is shown preferably composed of a thin rectangular plate or sheet of brass having a tongue 2 extending from one side edge thereof midway between the ends of the plate. This tongue 2 may be of any desired length, being here shown of a length corresponding to the width of the plate. The plate is folded or bent longitudinally at a point substantially midway between its side edges to form two yieldable handle gripping jaws 3 and 4, the jaw 3 from which the tongue 2 projects being flat and straight, while the other or movable jaw 4 is bent or curved transversely with its free edge extended inwardly toward the jaw 3 to form a space between the jaws for the reception of the handle of the utensil to be lifted. The free edge of the jaw 4 is preferably sharpened and adapted to bite into the utensil handle when pressure is exerted to force the jaws toward each other and said sharpened inner edge is normally spaced from the jaw 3 a sufficient distance to permit the ready insertion of a handle between them. The free edge of the jaw 3 is preferably bent slightly inward to form a lip 5 to prevent the utensil handle from slipping laterally from between the jaws. The bending or curving of the jaw 4 reduces its width from edge to edge and positions its free edge at a point spaced inwardly from the free edge of the jaw 3 to arrange it in position to engage one piece of a utensil handle A and thereby bind it securely between the jaws. The tongue 2 is curved inwardly to form a hook like member 6 for engaging kettle bails or baking pan handles or similar devices. By so constructing the jaws 3 and 4 with the sharpened inturned edge on the curved jaw 4, said jaw by biting into the handle when pressure is exerted thereon prevents the members from slipping laterally relative to each other when the tongue 6 is compressed and thereby firmly grips the handle between the jaws. The tongue 6 performs the double function of a hook for lifting pots and kettles when desired and also as means for protecting the hand of the user and facilitating the compression of the jaws when gripping a handle between them.

In Fig. 1 the hook 6 is shown engaged with a coffee pot handle B, the weight of the pot being supported practically by one edge of the tongue and said tongue may be forced into contact with the handle by pressure exerted by the hand of the user. In Fig. 2 the device is shown applied to the handle A of a sauce pan or spider and in this application of the invention said handle A is gripped between the free edge of the jaw 4 and the adjacent face of the jaw 3. It will thus be obvious that this device is applicable to a number of uses and it will not be necessary to show the hook 6 engaged with a bail handle for lifting kettles and the like.

By constructing this device from a single sheet of metal folded as described above, it may be cheaply made and placed on the market at a very low cost and thus be within easy reach of people of moderate means.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing the advantages of this invention, as defined in the appended claim.

I claim as my invention:

A pan lifter comprising a one piece sheet metal plate bent to form resilient gripping jaws compressible to grip an article between them, one of said jaws being flat and straight and having an inturned flange at its free edge, and the other jaw bowed outwardly with its edge inturned and sharpened to grip the article clamped between the jaws, and a resilient inturned curved plate extending from the straight jaw and forming yielding means for compressing the sharpened edge into engagement with an article to be lifted.

In testimony whereof I have hereunto set my hand in presence of two subscribing witnesses.

MOSES HERZOG.

Witnesses:
L. O. HILTON,
RALPH HOGE.

Copies of this patent may be obtained for five cents each, by addressing the "Commissioner of Patents, Washington, D. C."